United States Patent [19]

Held

[11] 4,455,751

[45] Jun. 26, 1984

[54] AUTOMATIC DRAFTING DEVICE

[76] Inventor: Kurt Held, Alte Str. 1, D-7218 Trossingen 2, Fed. Rep. of Germany

[21] Appl. No.: 347,968

[22] Filed: Feb. 11, 1982

[30] Foreign Application Priority Data

Feb. 12, 1981 [DE] Fed. Rep. of Germany ....... 3104962

Nov. 6, 1981 [DE] Fed. Rep. of Germany ....... 3144057

[51] Int. Cl.[3] ......................... G01D 9/00; B43L 13/02

[52] U.S. Cl. ....................................... 33/18 R; 346/29

[58] Field of Search .................... 33/1 M, 18 R, 18 B, 33/26, 45, DIG. 8; 346/29, 139 R

[56] References Cited

U.S. PATENT DOCUMENTS

| | | | |
|---|---|---|---|
| 1,746,420 | 2/1930 | Fung | 33/1 M |
| 2,332,511 | 10/1943 | Glassman et al. | 33/18 B |
| 4,197,550 | 4/1980 | Held | 33/18 R |
| 4,346,445 | 8/1982 | Leuenberger et al. | 33/18 R |
| 4,356,632 | 11/1982 | Anderka | 33/18 R |

FOREIGN PATENT DOCUMENTS

| | | | |
|---|---|---|---|
| 1152829 | 8/1963 | Fed. Rep. of Germany | 33/1 M |
| 771607 | 4/1957 | United Kingdom | 33/1 M |

*Primary Examiner*—Richard R. Stearns

*Attorney, Agent, or Firm*—Toren, McGeady and Stanger

[57] ABSTRACT

An automatic drafting device has a carriage with toothed wheels in meshed engagement with toothed racks extending across a planar support surface. A pressure regulation device is mounted on the carriage and regulates the pressure applied to a stylus holder held by the device. The stylus holder containing a writing instrument can be lifted and lowered by a direct current motor with an eccentric disc. The writing tip of the instrument held in the stylus holder, when not in use, is supported on a soft resilient material, such as rubber, to form a seal preventing air from reaching the tip. When the writing instrument is lifted off the resilient material it is ready to write.

10 Claims, 3 Drawing Figures

AUTOMATIC DRAFTING DEVICE

SUMMARY OF THE INVENTION

The present invention is directed to an automatic drafting device and, more specifically, to a device including a carriage mounted on wheels or rollers for movement over a planar surface on which the drafting can be carried out. The carriage includes a controllable writing device. A member is provided for receiving the writing tip of the writing instrument supported in the writing device for sealing the writing tip from the surrounding air.

Devices for automatic lettering of drawings are known where a stylus or writing instrument is mounted on a carriage movable over a planar surface on which the drafting can be carried out.

In West German Offenlegungsschrift No. 27 24 855 a device is disclosed for automatic lettering of drawings with alphabetic or numerical characters, drawing symbols and the like. This device has a carriage which can be moved over the drawing surface and supports a controllable writing device. A control unit is connected to the carriage by flexible lines. This device is characterized by a stylus on the writing device held at the end of two arms which are interconnected in an articulated manner with the arms being mounted on the carriage and extending at an angle to one another. The arms can be freely pivoted about an axis perpendicular to the drawing plane. Moreover, the length of the arms can be varied by a feed spindle. The feed spindles are driven by electric motors controlled by a program stored in the control unit. The movement of the spindles can be selected by a program selection device.

In West German Auslegeschrift No. 28 09 480 there is a known drafting device including a computer with an input or entry keyboard for numerical data, one or more memory banks, a writing device and drive devices for moving the writing device. Control members operate the drive devices with data recalled from the memory banks. This drafting device is distinguished by the fact that the computer is a pocket computer and also by the fact that one or more motors move the drafting device by wheels or tracks on the drafting surface. In this drafting device, the control devices control the motors which operate the writing device and the drive devices move the writing device. This control action is performed with data, for example, X and Y coordinates of a curve, recalled from the memory bank.

Another West German Auslegeschrift No. 22 30 671 describes a writing mechanism including a matrix printer or a stylus printer arranged on the underside of a movable carriage. The carriage is moved manually on the writing or drafting surface and the movement is measured by wheels which travel over the drawing or drafting surface. Instructions for printing characters or symbols are provided after specified feed intervals. All of these known drafting devices, regardless of whether they are provided with a carriage movable on the drafting surface manually, mechanically or electrically, have the disadvantage that a certain slippage of the wheels takes place as they move over the drafting surface. Such slippage can lead to variable spacings between the characters or symbols recorded by the drafting device and also to distortions of the characters or symbols. Further, a blurring of the drawing may occur since it has not been possible in the past to adapt the writing pressure of the stylus or writing instrument on the drafting surface to the instruments used in individual cases, for example, when felt pens or the like are used. As a result, the known devices can only apply a limited number of characters or symbols on a drafting plane or surface.

Another problem faced by such automatic drafting devices is that the writing fluid must dry as quickly as possible when applied to the drafting surface so that it does not run or smudge. On the other hand, however, during the writing operation when there is a pause, the writing fluid at the writing tip must remain instantly ready to resume writing, that is, the writing fluid at the tip must not become dry.

In hand-guided writing devices, such as the drawing ink devices supplied by Rotring-Werke Riepe K.G., Hamburg, Standard-zeichengeräte GmbH, Geretsried, and Staedtler, Nürnberg, an attempt has been made to solve the problem by using a so-called tube pen, which is a guide tube for the drawing ink. The guide tube is filled with a thin wire weighted by a falling weight, so that it projects out of the end of the tube when writing is commenced for removing any drawing ink crust that may have accumulated. In other words, the writing capability is restored as soon as the thin wire and guide tube are set down on a writing surface.

Such a device is useful where short pauses in writing occur and for hand-guided writing devices, since the writing difficulties which occur at start-up can be solved by shaking the writing device and agitating the falling weight-wire in the tube. Alternatively, at the commencement of writing, the guide tube with its weighted wire can be moved back and forth over the writing surface until the writing liquid flows out of the tube. Split drafting pens can be readied for writing in the same manner.

For automatic writing devices, such as the NC-scriber of the Rotring-Werke firm, an attempt has been made to overcome the problem by having the person operating the device repeat the first character automatically written when it is observed that the writing liquid is not flowing. Such an operation is disadvantageous, since repeating the first character does not assure with a desired degree of certainty that the drawing ink will start to flow. Further, in this device, apart from the start-up operation, it may require the attention of the operator for another function. During long interruptions in the use of the writing device, the writing tip or nib usually dries up requiring the removal of the writing instrument from the device followed by a time-consuming cleaning of the device so that an interruption in the working operation is unavoidable.

Therefore, it is the primary object of the present invention to improve the wiring quality of such devices by avoiding or entirely eliminating the slippage of the wheels traveling over the drawing or writing surface.

Further, another primary object of the invention is to vary the writing pressure acting on the writing tip or stylus and to adapt it to the individual writing instrument being used.

In accordance with the present invention, the automatic drafting device and its movable carriage can be made relatively small and light so that it permits the lettering of any desired characters, symbols or the like in a continuous manner and of any desired size.

Another object of the invention is to assure when writing or lettering is commenced with the automatic writing device that its writing tip or stylus permits ink to flow immediately even when writing liquids are used which dry extremely fast or have a high pigment content.

To avoid any slippage, the carriage of the drafting device is supported on toothed wheels which intermesh with toothed racks or toothed rack tracks extending across the drawing surface for affording exact movement of the carriage. Further, a pressure regulation device is incorporated with the carriage and regulates the pressure applied to the stylus or writing instrument holder of the drafting device.

Further, in accordance with the present invention, it can be assured that the writing tip is always ready by providing a seal about the writing tip when it is not in use. The seal prevents air from reaching the writing tip so that the ink or writing liquid will not become dry. Preferably, the seal is formed by a soft resilient material against which the writing tip is placed.

In accordance with the present invention, when the writing operation has been completed or a pause of a predetermined time takes place in the writing operation, the writing tip is pressed by its support structure against a plate located on the drafting device. The plate is formed of a soft resilient material, such as rubber or soft PVC. Placement of the writing tip against the soft elastic material provides a seal or closure around the tip and, although the plate is moistened by the writing fluid and even though long interruptions in the writing operation occur, the writing fluid will immediately flow when the writing tip is lifted from the plate. Any dried remnants of the writing fluid remain on the plate. As a result, the drafting device is immediately ready to write and the problems previously experienced at start-up do not occur.

Such operation of the drafting device can be carried out over a period of hours, depending on the pigment and binder content of the writing fluid. Even if the writing fluid dries on the soft elastic material plate, the plate can be easily cleaned with a damp cloth or, since the cost of the plate is negligible, it can be replaced.

In accordance with the present invention the drying action of the writing fluid in the stylus or writing tip, so that flow is blocked when writing is commenced, can be avoided by providing a seal about the writing fluid outflow and various embodiments can be used based on the geometry and mode of operation of the drafting device.

In one arrangement, a strip or plate of soft elastic material can be placed along one edge of the rack supporting the carriage of the drafting device. When not in use the writing tip can be placed against this strip of material. If it is necessary to close or seal more than the immediate writing tip, it is possible to place the writing end of theinstrument in an upright case formed of the soft resilient material. In addition, it is possible to insert the writing tip into a shuttered slit or the like.

In the automatic writing device the writing instrument is always ready not only for normal writing operation where the device is operated by the keyboard on the carriage, but particularly where stored text or symbols are to be written on the drafting surface. Such text may be several lines in length and the symbols may be several centimeters high with the writing being executed at speeds of about 100 mm/sec. With the seal provided about the writing tip so that it is ready to write at start-up, is especially advantageous where such text or symbols are to be written. It can be appreciated that it is especially helpful if it is not necessary to write over the writing fluid previously deposited, since there is a tendency to smudge the written characters.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
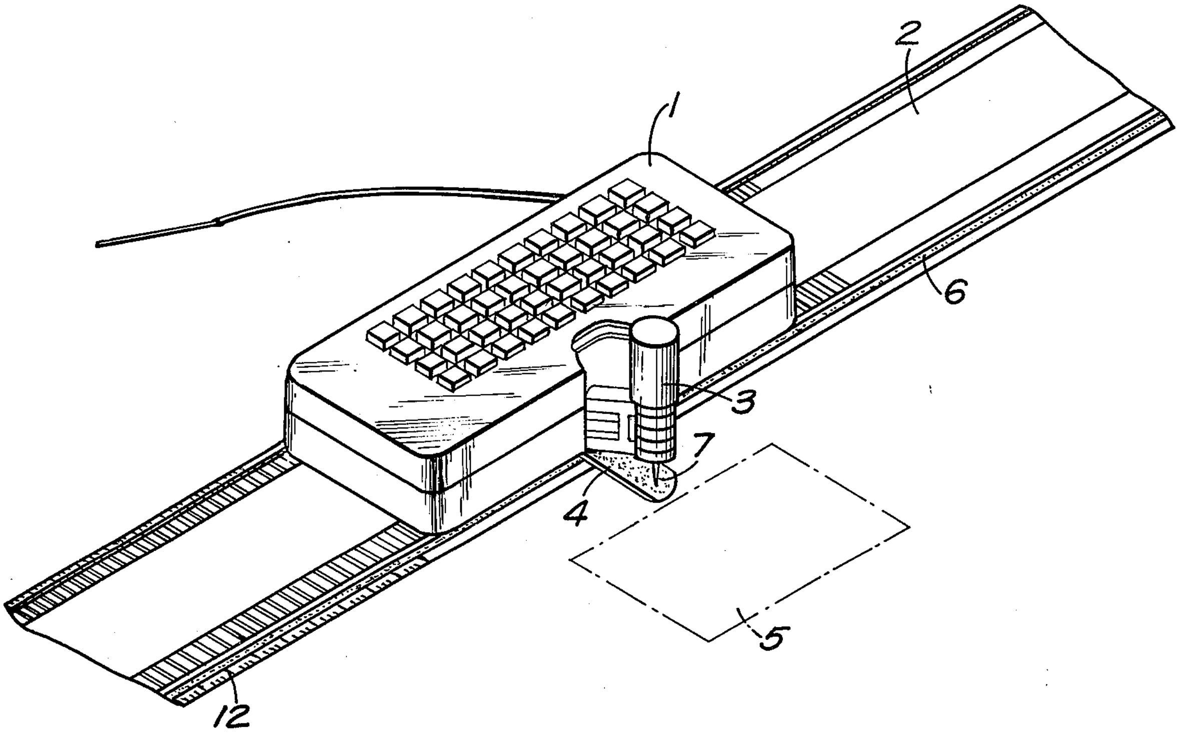
FIG. 1 is a perspective view of an automatic drafting device embodying the present invention.

In FIG. 1 an automatic drafting device is illustrated and it includes a generally rectangularly shaped carriage 1 with a keyboard on its upper surface.

Figure 2:
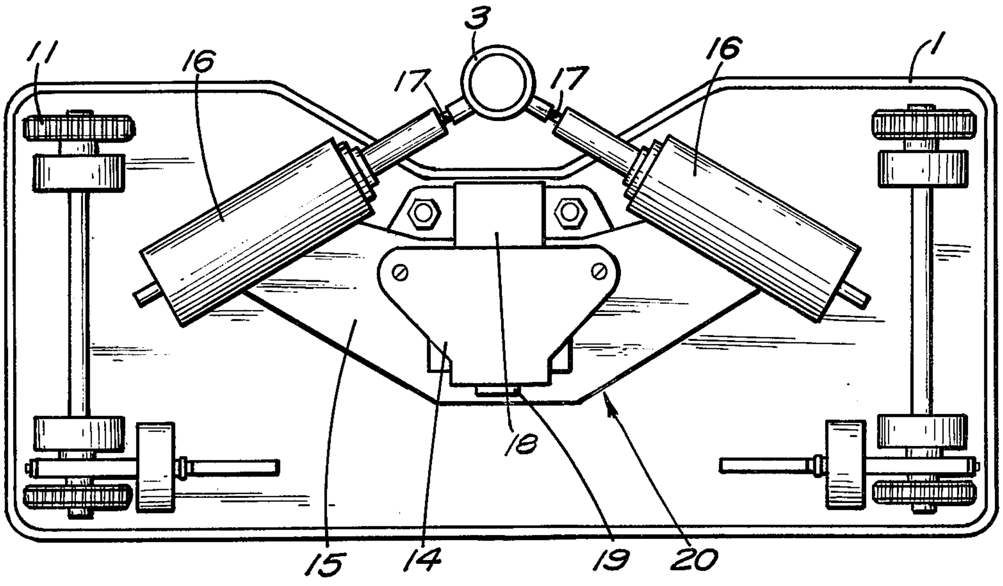
FIG. 2 is a schematic plan view of the carriage forming a part of the drafting device in FIG. 1 with the supporting wheels for the carriage being shown.

In FIG. 2 it can be seen that the carriage 1 is mounted on toothed wheels or rollers 11 which mesh with a rectilinear toothed rack 2. The toothed rack 2 has a pair of rack tracks over which the toothed wheels 11 can be moved. The rack tracks extend in the long direction of the carriage with each of the wheels extending across each short side of the carriage being engaged in a different track.

A stylus holder 3 is mounted on the carriage 1 and is located outwardly from one of the long sides of the carriage. A writing instrument with a writing tip or stylus 7 is supported in the stylus holder and extends downwardly so that it can write characters, symbols or text on a writing or drafting surface 5 below the stylus holder. The rack 2 is located on or directly above the drafting surface. Below the stylus holder 3 a support member 4 is provided on which the writing tip 7 can be rested when there is a pause or interruption in the writing operation. The support member 4 is secured on the rack 2 and projects outwardly from the carriage so that the stylus holder, when not in use, can place the writing tip 7 downwardly on the support member. The support member 4 can be moved along a rectilinear strip 6 running alongside one of the rack tracks of the rack 2.

In another embodiment of the invention, it would be possible to arrange the entire rectilinear strip 6 as a support member for the writing tip. The support member 4 or the strip 6 when it is used to support the writing tip 7, can be covered with a suitable soft resilient material so that a seal is provided around the writing tip 7 if it is placed downwardly on the support member or strip. It would also be possible to form the support member as an upwardly extending case made out of the soft resilient material so that the seal is effected when the writing tip 7 is placed into the case. In another embodiment, a conical slit in a member formed of soft resilient material can be used as the sealing support member for the writing tip. The stylus holder 3 is operated so that it can be moved between the writing or drafting field 5 on the drafting surface and the support member 4 or strip 6. When the writing tip is placed downwardly on the soft resilient material a seal is provided around the tip so that air does not reach the writing fluid in the tip and cause it to dry up and harden, blocking flow out of the tip.

In FIG. 1 a scale 12 extends along the long sides of the rack 2 to facilitate dimensioning of the drawing or drafting surface over which the carriage rides.

The stylus holder 3 extends generally perpendicularly of the rack 2 and the planar drafting surface over which the carriage moves. In FIG. 2 a pivot device 14 is shown within the carriage located approximately midway along one of the long sides. Pivot device 14 includes leaf springs 15 extending laterally from both of its sides in the long direction of the carriage. A hollow shaft motor 16 is located at each of the opposite ends of the leaf springs 15 and the motors extend obliquely of the long direction of the carriage outwardly toward the stylus holder 3. Each hollow shaft motor 16 has a threaded spindle 17 which projects outwardly from the carriage and supports the stylus holder 3. The spindles 17 are secured to the stylus holder at angularly spaced positions about its periphery. A direct current motor 18 with an eccentric disc 19 is arranged in the carriage to raise and lower a writing pressure regulation device 20 made up of the pivot device 14, the lead springs 15, the hollow shaft motors 16 and their spindles 17 and the stylus holder 3. By means of the direct current motor 18 the pressure applied to a writing instrument mounted in the stylus holder 3 can be effectively regulated.

The control of the carriage is provided by a control unit, not shown, in which programs are stored. The programs can be selected by the keyboard on the carriage. Accordingly, the control of the stylus holder for writing or drawing a character or symbol on the drafting surface and an instruction for driving the toothed wheels 11 of the carriage 1 can be provided from the control unit. After the writing tip 7 of the writing instrument mounted in the stylus holder places the desired character or symbol on the drafting surface, the carriage can be moved to the desired spacing, for instance one or more character spaces, into position to write the next character or symbol. Slippage of the carriage is avoided, since the toothed wheels 11 mesh in the tracks of the rectilinear rack 2. While the characters are being applied to the drafting surface by the instrument in the stylus holder 3, the carriage 1 is held in a stationary position, accordingly, no distortion of the characters can take place. If there is an interruption in the writing operation, the writing tip 7 can be placed on the support member 4 or on the strip 6 so that it is sealed from the air while it is not being used.

The surface of the support member 4 or strip 6 is a soft resilient or elastic material, such as rubber, a soft plastics material such as PVC or the like.

Figure 3:
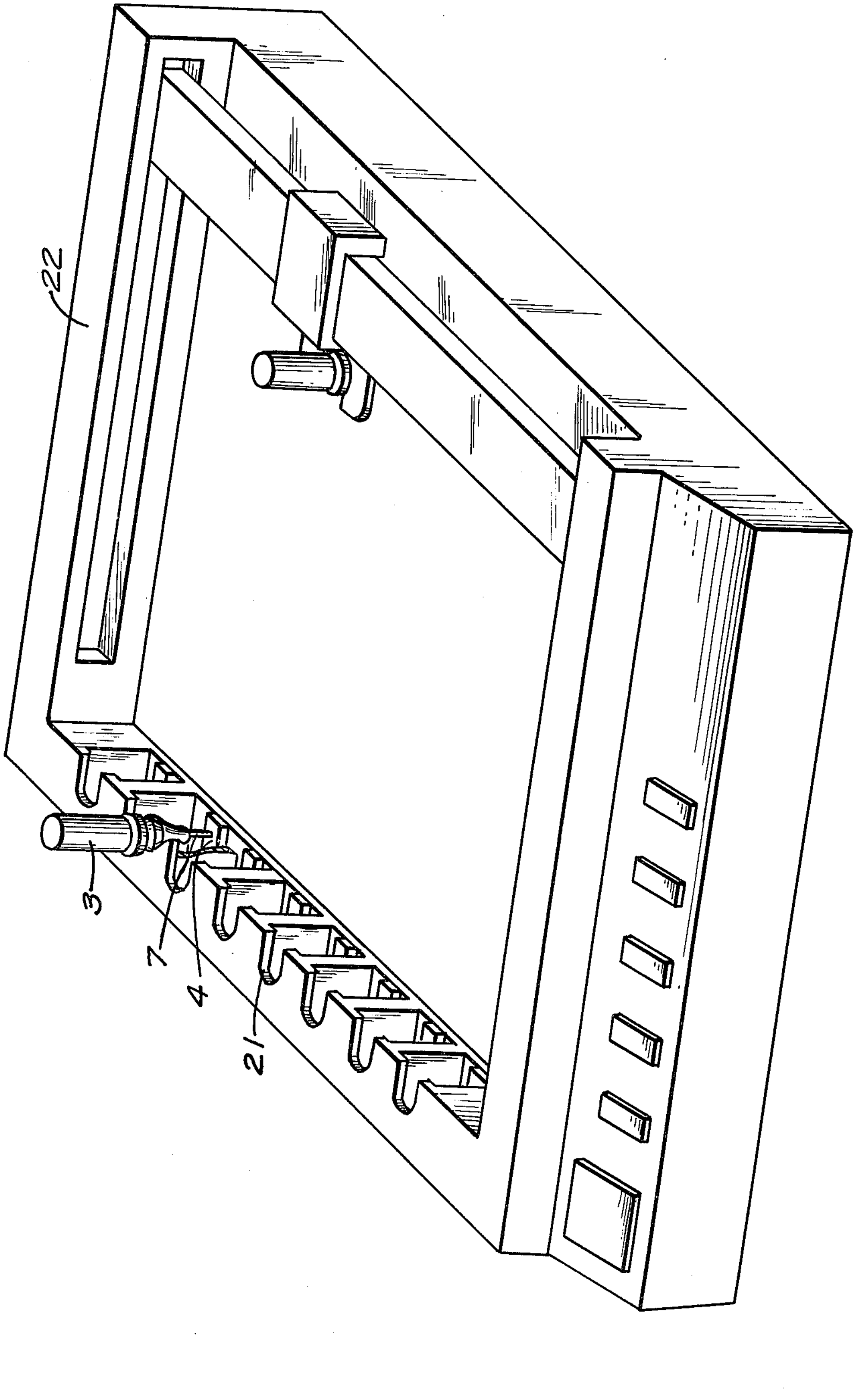
FIG. 3 is a perspective view of an automatic drafting device utilizing a plurality of writing instruments.

In FIG. 3 a so-called plotter 22 is shown with a writing instrument including a stylus holder located along one side of the plotter and a plurality of soft resilient material support members, cases or sealing members 4 are positioned within a holding fixture 21 for separate writing tips 7 or combined stylus holders 3 and tips 7 when they are not being used. Accordingly, the writing tip 7 supported in the holding fixture 18 is sealed by the sealing member 4 until it is needed in the operation of the plotter.

While specific embodiments of the invention have been shown and described in detail to illustrate the application of the inventive principles, it will be understood that the invention may be embodied otherwise without departing from such principles.

I claim:

1. An automatic drafting device comprising a carriage, means mounting said carriage for movement over a planar drafting surface, a controllable writing device including a stylus holder supported on said carriage, a writing tip supported in and extending from said stylus holder, said controllable writing device including a pressure regulation device on said carriage for regulating the pressure applied to said stylus holder for effecting writing on the drafting surface, said pressure regulating device includes a pivot unit located on said carriage, said pivot unit includes leaf springs, a pair of hollow shaft motors each having a threaded spindle mounted on said leaf springs, said hollow shaft motors being spaced apart and said threaded spindles thereon each extend toward said stylus holder from a different angle and support said stylus holder at angularly spaced locations thereon, a direct current motor having an eccentric disc in operative connection with said pivot unit for raising and lowering said stylus holder, a toothed rack arranged to be located on and to extend along the planar drawing surface and said means for mounting said carriage comprises toothed wheels in meshed engagement with said rack.

2. Automatic drafting device, as set forth in claim 1, including a scale extending along said rack for effecting dimensioning on said drafting surface.

3. Automatic drafting device, as set forth in claim 1, wherein said rack is an elongated rectilinear support having a pair of laterally spaced parallel rack tracks thereon.

4. Automatic drafting device, as set forth in claim 3, wherein said carriage is a rectangularly shaped member having two pair of wheels thereon with at least one said wheel in each said pair arranged to mesh with one of said rack tracks.

5. Automatic drafting device, as set forth in claim 1, including means arranged to receive said writing tip for forming a seal about said writing tip for preventing air from reaching the writing tip.

6. Automatic drafting device, as set forth in claim 5, wherein said means for forming a seal comprises a soft resilient material.

7. Automatic drafting device, as set forth in claim 6, wherein said soft resilient material comprises rubber.

8. Automatic drafting device, as set forth in claim 6, wherein said soft resilient material comprises PVC.

9. Automatic drafting device, as set forth in claim 5, wherein said means for forming a seal comprises a support member located below said writing tip supported in the stylus holder for providing a rest for said writing tip when it is not in use.

10. Device, as set forth in claim 5, wherein said rack is an elongated rectilinear support having a pair of laterally spaced parallel rack tracks thereon, said means for forming a seal comprises an elongated strip located on said rack and extending thereon in the direction of said rack tracks.

* * * * *